United States Patent
Damman et al.

[19]

[11] Patent Number: 5,931,489
[45] Date of Patent: Aug. 3, 1999

[54] AIR BAG MODULE WITH EXTRUDED HOUSING

[75] Inventors: Alex Scott Damman, Clayton, Ohio; John Clifford Hattery, Jr., Deerfield, Ill.; Mark Thomas Winters, Troy, Ohio

[73] Assignee: General Motors Corporation, Detroit, Mich.

[21] Appl. No.: 08/861,342

[22] Filed: May 21, 1997

[51] Int. Cl.⁶ .................................................. B60R 21/20
[52] U.S. Cl. ..................................... 280/728.2; 280/728.3
[58] Field of Search ........................... 280/728.2, 728.3, 280/730.2, 732, 736, 740, 728.1

[56] References Cited

U.S. PATENT DOCUMENTS

| | | | |
|---|---|---|---|
| 4,941,678 | 7/1990 | Lauritzen et al. | 280/732 |
| 5,058,919 | 10/1991 | Paquette et al. | 280/732 |
| 5,261,693 | 11/1993 | Krickl et al. | 280/732 |
| 5,263,739 | 11/1993 | Webber et al. | 280/728.2 |
| 5,351,987 | 10/1994 | Donegan et al. | 280/728.2 |
| 5,395,133 | 3/1995 | Lauritzen et al. | 280/732 |
| 5,407,227 | 4/1995 | Lauritzen et al. | 280/732 |
| 5,431,432 | 7/1995 | Webber et al. | 280/728.2 |
| 5,474,325 | 12/1995 | Daines et al. | 280/728.3 |
| 5,480,182 | 1/1996 | Lauritzen et al. | 280/728.2 |
| 5,647,608 | 7/1997 | Damman et al. | 280/728.2 |
| 5,676,393 | 10/1997 | Rose | 280/728.2 |
| 5,681,050 | 10/1997 | Damman et al. | 280/728.2 |
| 5,681,055 | 10/1997 | Green et al. | 280/728.2 |

FOREIGN PATENT DOCUMENTS

WO 94/25313  11/1994  WIPO.
WO 95/15871  6/1995  WIPO.

*Primary Examiner*—Peter C. English
*Attorney, Agent, or Firm*—Kathryn A. Marra

[57] ABSTRACT

An air bag module includes an inflator and an air bag for inflation. The air bag includes retainer bars for attachment of the air bag to the housing. The module further includes an axially elongated, open-ended, generally cylindrical extruded housing having a circular-shaped cross section defined by a single cylindrical wall having an internal wall surface and an external wall surface. The housing includes integrally extruded air bag channels directly disposed on the external wall surface. The integrally extruded air bag channels axially receive the retainer bars of the air bag therein for attachment of the air bag to the housing such that the cylindrical wall and the air bag channels form a generally cylindrical-shaped housing which is lightweight and compact. Preferably, the module includes exactly two integrally formed channels directly disposed on the housing and a cover having axially extending enlarged portions thereon. The enlarged portions are preferably hollow and sized and shaped for receiving the retainer bars and enlarged portions therein. Thus, exactly two channels on the housing advantageously mount both the air bag and the cover to the housing.

16 Claims, 6 Drawing Sheets

AIR BAG MODULE WITH EXTRUDED HOUSING

TECHNICAL FIELD

This invention relates to an air bag module having an extruded housing.

BACKGROUND OF THE INVENTION

It is well known in motor vehicles to provide an air bag module mounted beneath an opening in the instrument panel. The module typically includes a metal housing having opposing side walls and end walls defining an air bag deployment opening. The module also typically includes an air bag having a mouth portion mounted to the housing by an air bag retainer. The module typically includes a cover for overlying the housing and for maintaining the air bag in the folded condition. Upon air bag inflation, the cover breaks open and the air bag deploys out from the housing through an opening in the instrument panel.

It is also known in the prior art that the housing may be formed as an extrusion. Extruded housings of the prior art typically have complex shapes with two or more straight side and bottom walls and sharply angled walls or flanges for attaching the air bag, cover and inflator. These outwardly protruding walls and flanges add complexity to the extrusion process. In addition, the extra walls and flanges add weight and size to the housing, making the housing heavier and larger to package in the limited space of the vehicle. In addition, a multiple number of flanges and walls are used to separately attach the cover and the air bag to the housing.

SUMMARY OF THE INVENTION

The present invention provides alternatives and advantages over the prior art by providing an air bag module having an extruded housing which is lightweight and easy to extrude by eliminating numerous side walls or flanges and sharply angled edges. Advantageously, the extruded housing of the present invention has a generally cylindrical profile shape for extrusion which is well-balanced to promote an even, balanced flow of material across the profile during the extrusion process. In addition, the extruded housing preferably provides an integrally extruded feature that serves as a diffuser portion without requiring any separate parts. Also preferably, the housing includes integrally extruded features which make the cover and air bag easily attachable to the housing without the use of rivets or other traditional fasteners. Advantageously, the housing preferably includes a single integrally formed feature that secures both the cover and the air bag to the housing. Advantageously, the housing is preferably formed by a single cylindrical-shaped wall that advantageously holds the inflator, air bag and cover in position relative to each other. Also advantageously, the size and weight of the housing is minimized by having an overall cylindrical shape and a single integral feature that retains both the cover and air bag. In addition, the module offers flexibility in cover designs with or without show surfaces and including covers having tear seams which are not visible when the module is mounted in the vehicle.

These advantages are accomplished in a preferred form of the invention by providing an air bag module including an axially elongated inflator for generating inflator gas and an air bag for inflation upon the discharge of the inflator gas from the inflator. The air bag includes axially elongated retainer bars for attachment of the air bag to the housing. The module further includes an axially elongated, open-ended, generally cylindrical extruded housing having a circular-shaped cross section defined by a single cylindrical wall having an internal wall surface and an external wall surface. The inflator is disposed within the internal wall surface and the cylindrical wall includes at least one diffuser opening therethrough for diffusing gas into the air bag. The housing includes first and second integrally extruded air bag channels directly disposed on the external wall surface on opposing sides of the diffuser. The integrally extruded air bag channels axially receive the retainer bars of the air bag therein for attachment of the air bag to the housing such that the cylindrical wall and the air bag channels form a generally cylindrical-shaped housing which is lightweight and compact.

In accordance with other preferred aspects of the invention, the module includes exactly two integrally formed channels directly disposed on the housing and a cover having axially extending enlarged portions thereon. The enlarged portions are preferably hollow and sized and shaped for receiving the air bag retainer bars and enlarged portions therein. Preferably, one of the enlarged portions and one of the retainer bars are captured within one of the channels and the other of the enlarged portions and the other of the retainer bars is captured in the other of the channels whereby exactly two channels on the housing advantageously mount both the air bag and the cover to the housing. Also preferably, the enlarged portions each include a slitted opening through which the air bag extends upon attachment of the retainer bars to the enlarged portions of the cover.

Preferably, the cover is generally U-shaped and includes first and second axially extending side walls on which the enlarged portions are respectively disposed. The cover may also include an integrally formed upper show wall extending generally perpendicular to the side walls. Preferably, the cover includes a weakened tear seam disposed on one of the side walls and beneath the upper show wall such that the tear seam is invisible from the upper show wall. The cover may further include integrally formed end walls extending between and closing the side walls and a weakened tear seam extending continuously around both of the end walls and one of the side walls such that this tear seam is also invisible from the upper show wall.

BRIEF DESCRIPTION OF THE DRAWINGS

Embodiments of the present invention are described, by way of example only, with reference to the accompanying drawings in which.

DESCRIPTION OF THE PREFERRED EMBODIMENT

Figure 1:
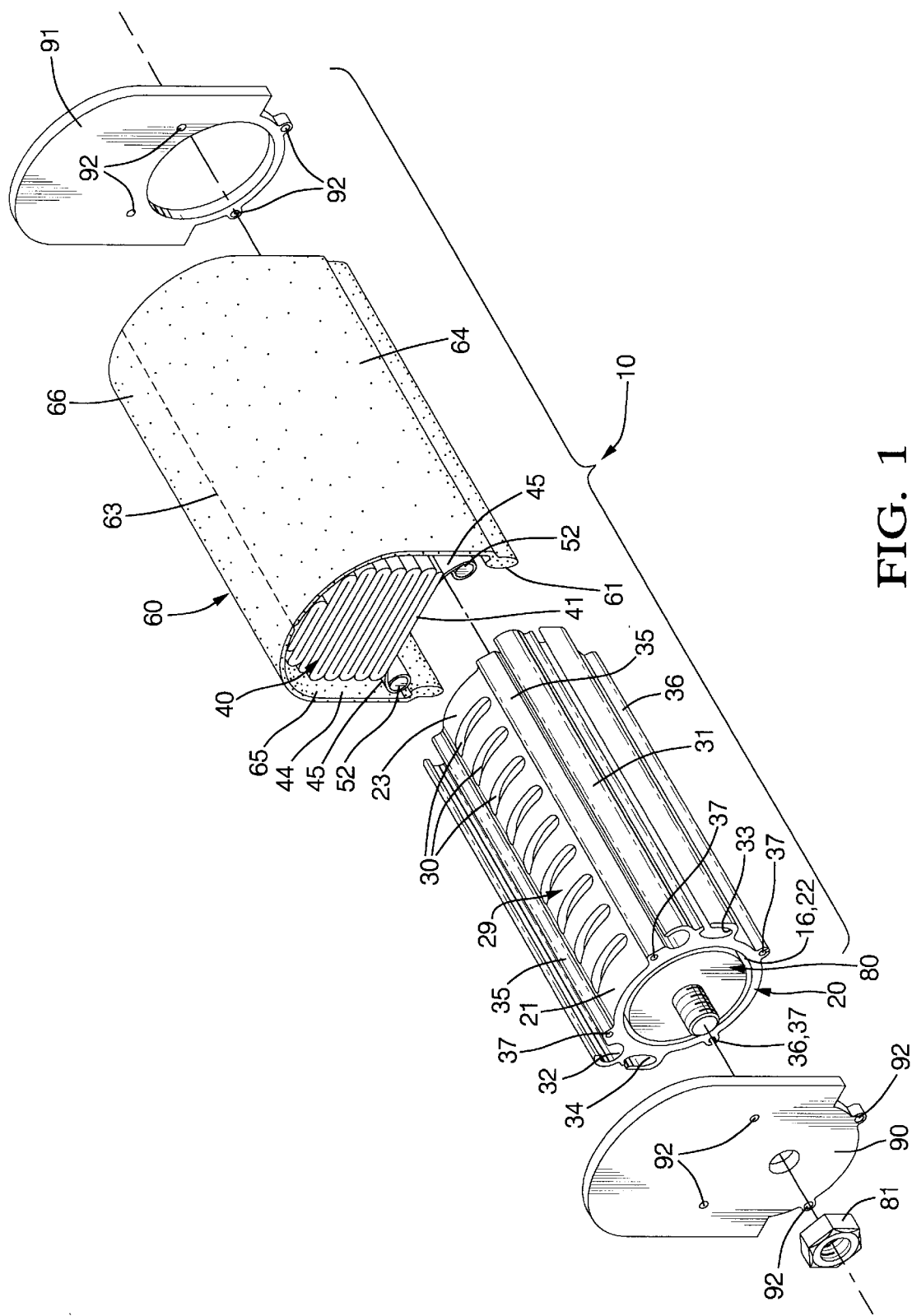
FIG. 1 is an exploded perspective view of the air bag module.

As best shown in FIG. 1, an air bag module 10 generally includes the component parts of an extruded housing 20, an inflator 80 mounted in the housing 20, an air bag 40 secured to the housing 20 and a pair of opposing end plates 90, 91 attached to the housing 20. The module 10 further includes a cover 60 secured to the housing 20. The entire module 10 is typically mounted beneath an instrument panel (not shown) of a vehicle prior to deployment. However, it will also be appreciated that the relatively compact and lightweight module 10 could be mounted in any vehicle location.

The housing 20 is an open-ended, axially elongated, single continuous extrusion generally formed as a tube and having a cylindrical wall 21 including an internal cylindrical surface 22 and an external cylindrical surface 23. The housing 20 includes opposing open ends 16. The extruded housing 20 also preferably includes an integrally formed, axially extending diffuser portion 29 which is integrally formed as part of the cylindrical wall 21. It will be appreciated that any number and arrangement of diffuser openings 30 may be provided in the cylindrical wall 21 by a secondary operation to provide the diffuser portion 29. Preferably, the diffuser portion 29 enables the discharge of inflator gas more evenly into the air bag 40 upon inflation.

The housing 20 preferably includes first and second axially extending air bag channels 31, 32 which preferably extend along the entire axial length of the housing 20. The first and second air bag channels 31, 32 are preferably extruded directly onto the external cylindrical surface 23 of the housing 20. The first and second air bag channels 31, 32 are each preferably spaced circumferentially apart on opposing sides of the diffuser portion 29. Advantageously, the air bag channels 31, 32 disposed on the external cylindrical surface 23 maintain the generally cylindrical shape of the housing 20 such that the housing 20 is compact for packaging. The air bag channels 31, 32 are sized and shaped for receiving respective air bag retainer bars 52 therein which are secured to a mouth portion 41 of the air bag 40 for attaching the air bag 40 to the housing 20 without the use of fasteners, as described further hereinafter. The air bag channels 31, 32 are advantageously located on opposing sides of the diffuser openings 30 for better distribution of the discharging inflator gas into the air bag 40 during inflation.

The housing 20 preferably includes first and second axially extending cover channels 33, 34 which preferably extend along the entire axial length of the housing 20. The cover channels 33, 34 are also preferably extruded directly onto the external cylindrical surface 23 of the housing 20. The cover channels 33, 34 are preferably spaced circumferentially further apart from the diffuser portion 29 than the air bag channels 31, 32 around the external cylindrical surface 23 of the housing 20. Preferably, the air bag channels 31, 32 are positioned between the cover channels 33, 34 and the diffuser portion 29. Thus, both of the cover channels 33, 34 are preferably located below the respective air bag channels 31, 32 such that the assembled cover 60 will completely overlie the air bag 40 to maintain the air bag 40 in the folded condition. The cover channels 33, 34 are sized and shaped for receiving respective first and second enlarged portions 61, 62 on the cover 60 therein to slidably secure the cover 60 to the housing 20 without the use of fasteners, as described further hereinafter. Advantageously, the air bag channels 31, 32 and the cover channels 33, 34 disposed directly around and on the external cylindrical surface 23 maintain the generally cylindrical shape of the housing 20 such that the housing 20 is compact for packaging and lacks sharp edges and sharp outwardly protruding walls or flanges. This is further enabled by the cover 60 which maintains the air bag 40 in the folded condition and also serves as a deployment guide, as described further below.

The extruded housing 20 may also preferably include an integrally extruded and axially extending short attachment flange (not shown) which is extruded directly onto the external cylindrical surface 23 of the housing 20. The attachment flange is preferably circumferentially spaced apart from the air bag channels 31, 32 and cover channels 33, 34 such that the overall cylindrical shape of the housing 20 is maintained. The attachment flange can be used to attach the entire module 10 to the vehicle by the attachment of fasteners (not shown) through flange apertures (not shown) for attachment to any suitable vehicle structure.

The housing 20 also preferably includes a plurality of axially extending, integrally formed pairs of upper and lower fastener channels 35, 36 extending the entire axial length of the extruded housing 20. The fastener channels 35, 36 are preferably extruded directly onto the external cylindrical surface 23 of the cylindrical wall 21 and are circumferentially spaced in relation to the diffuser portion 29, the air bag channels 31, 32 and the cover channels 33, 34. Preferably, the upper pair of fastener channels 35 are each positioned circumferentially between the diffuser portion 29 and the respective air bag channels 31, 32. Preferably, the lower pair of fastener channels 36 are each positioned circumferentially between the two cover channels 33, 34 on opposing lower sides of the external cylindrical surface 23 of the housing 20. Advantageously, the fastener channels 35, 36 disposed on the external cylindrical surface 23 maintain the generally cylindrical shape of the housing 20 such that the housing 20 is compact for packaging and is free of sharp edges and walls. The fastener channels 35, 36 each include channel apertures 37 for receiving end plate fasteners 94 for attaching the end plates 90, 91 to the housing 20, as described below.

Figure 2:
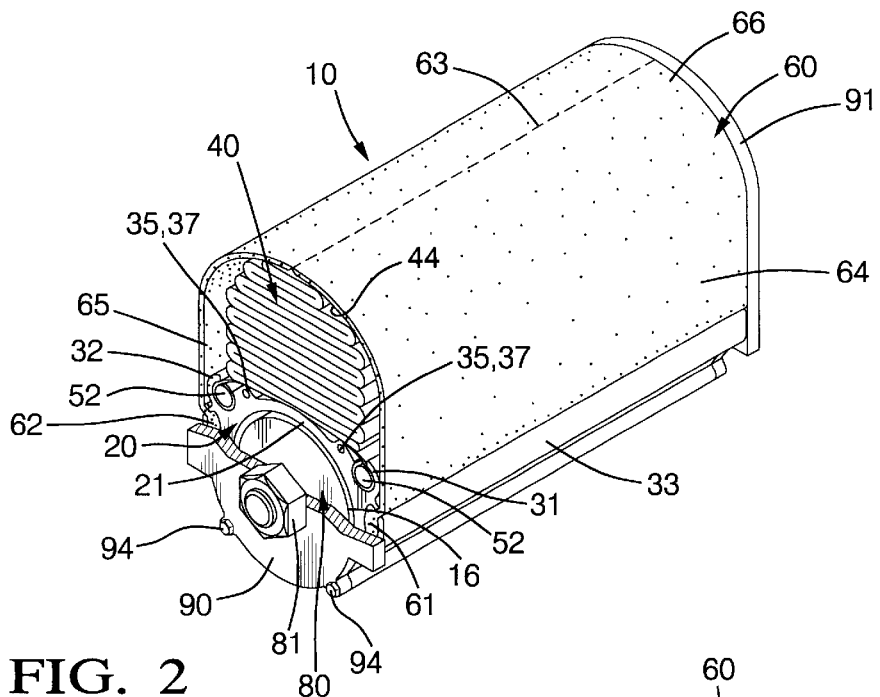
FIG. 2 is an assembled perspective view of the air bag module showing an end plate partially broken away.

As best shown in FIGS. 1 and 2, the module 10 preferably includes first and second end plates 90, 91 for closing the opposing open ends 16 of the extruded housing 20 and for axially trapping the inflator 80, the air bag 40, the air bag retainer bars 52 and the cover 60 on the housing 20, as described further hereinafter. The end plates 90, 91 each include a plurality of fastener apertures 92 therethrough. As shown in FIG. 2, the module 10 includes a plurality of end plate fasteners 94 for insertion through fastener apertures 92 in the end plates 90, 91 to secure the end plates 90, 91 to housing 20 at the channel apertures 37 on the fastener channels 35, 36.

The module 10 includes the axially elongated inflator 80 for discharging inflator gas upon sensing predetermined vehicle conditions to inflate the air bag 40. The inflator 80 is preferably of a thrust-neutral hybrid construction which discharges gas locally at one diametrically reduced end (not shown) having discharge ports thereon. The inflator 80 is mounted on the internal cylindrical surface 22 of the cylindrical wall 21 of the housing 20 and is easily axially inserted therein during assembly. The main body of the inflator 80 preferably has a diameter which is slightly smaller than a diameter of the cylindrical wall 21 such that the discharging inflator gas can travel along the axial length of the inflator 80 and more easily be directed and distributed out through the diffuser openings 30 of the diffuser portion 29.

Referring to FIGS. 1 and 2, the air bag 40 is made of a conventional fabric material and is normally stored in a folded condition within the cover 60. The air bag 40 includes a mouth portion 41 forming an air bag opening for receiving inflator gas therethrough. The mouth portion 41 includes axially extending, opposing side edges 45.

The module 10 also includes a pair of axially elongated retainer bars 52 each preferably being a one-piece continuous extrusion formed of a rigid material, such as metal or plastic. The side edges 45 of the air bag 40 are preferably wrapped around the retainer bars 52 and connected onto themselves, such as by sewing, to connect the retainer bars 52 to the air bag 40. The retainer bars 52 are sized and shaped for closely mating with the air bag channels 31, 32 formed on the extruded housing 20. The retainer bars 52 preferably are shown as generally circular for matching the generally circular shape of the air bag channels 31, 32 on the housing 20. However, it will be appreciated that any mating geometrical shapes of the retainer bars 52 and the air bag channels 31, 32 of the housing 20 may be possible, such as rectangular, oval or others.

The module 10 includes the cover 60 which is preferably integrally formed of a plastic material by injection molding. The cover 60 has a generally U-shaped cross-section and includes first and second axially extending side walls 64, 65 and a curved upper wall 66 extending between the side walls 64, 65. The cover 60 includes a weakened tear seam 63 on the upper wall 66 which extends axially along the length and which breaks open when pressure is exerted thereon by the deploying air bag 40. The weakened tear seam 63 may be provided by thinning or slotting the cover 60 as is well known in the art. The side walls 64, 65 of the cover 60 include axially extending, opposing enlarged portions 61, 62 on their lower edges. The enlarged portions 61, 62 of the cover 60 are preferably sized and shaped for closely mating with the cover channels 33, 34 formed on the extruded housing 20. The enlarged portions 61, 62 preferably are shown as generally oval for matching the generally oval shape of the cover channels 33, 34 on the housing 20. However, it will be appreciated that any mating geometrical shapes of the enlarged portions 61, 62 and the cover channels 33, 34 of the housing 20 may be possible, such as rectangular, circular or others. It will be appreciated that in this particular embodiment, the cover 60 is preferably not a show or decorative cover 60 and a separate show cover (not shown) may be provided in the instrument panel or other part of the vehicle under which the air bag module 10 is stored. Advantageously, the side walls 64, 65 of the cover 60 serve as a deployment guide for the air bag 40 and the cover 60 maintains the air bag 40 in the folded condition. Thus, any side walls on the housing 20 are eliminated and the housing 20 has a generally cylindrical shape which is lightweight, compact and easy to extrude.

The air bag module 10 is generally assembled as follows. After the retainer bars 52 are attached to the air bag 40, the retainer bars 52 are each coaxially aligned with the air bag channels 31, 32 on the housing 20 and axially slid therein for attachment to the housing 20. Next, the cover 60 is attached to the housing 20 by axially sliding the enlarged portions 61, 62 of the cover 60 into the respective cover channels 33, 34. It will be appreciated that the air bag 40 may be folded either prior to or after attachment to the housing 20 and the cover 60 maintains the air bag 40 in the folded condition.

The end plates 90, 91 are attached to the opposing open ends 16 of the housing 20 to axially trap the inflator 80, the enlarged portions 61, 62 of the cover 60, and the retainer bars 52 within the housing 20 to secure the cover 60, air bag 40 and inflator 80 within the housing 20. One of the end plates 90 is preferably attached to the housing 20 prior to attachment of the air bag 40 and cover 60 and the other of the end plates 91 is preferably attached to the housing 20 prior to the inflator 80. Also, the inflator 80 is axially inserted through the end plate 91 and into the cylindrical wall 21 of the housing 20 as the last step in the assembly of the module 10. End plate fasteners 94 are used to hold the end plates 90, 91 to the housing 20 at the fastener channels 35, 36 and a nut 81 is used to secure the inflator 80 to the end plate 90 as shown in FIGS. 1 and 2. In this embodiment, the end plates 90, 91 have a shape for covering both the open ends 16 of the housing 20 as well as the open ends 44 of the cover 60.

Upon the sensing of predetermined vehicle conditions, the inflator 80 generates inflator gas and discharges the inflator gas which is directed out through the diffuser portion 29 such that the inflator gas is distributed more evenly across the air bag 40. The air bag 40 fills with inflator gas and breaks open the tear seam 63 of the cover 60 for deployment. The air bag 40 and cover 60 remain anchored to the housing 20 during deployment by the trapping of the retainer bars 52 and enlarged portions 61, 62 within the air bag and cover channels 31, 32, 33, 34, respectively. Also advantageously, the air bag 40 is directed during deployment by the side walls 64, 65 of the cover 60.

It will be appreciated that advantageously, the extruded housing 20 having a generally cylindrical shape is easy to extrude since typical numerous side walls and sharply angled edges on the housing 20 are eliminated. Advantageously, the cylindrical extruded housing 20 of the present invention has a cylindrical-shaped profile for extrusion which is well-balanced across the extrusion die to promote even flow of material during the extrusion process. In addition, the cylindrical wall 21 provides an integrally extruded diffuser portion 29 for the inflator gas. Thus, the module 10 is compact and lightweight for packaging in the vehicle. Also advantageously, the housing 20 includes the integrally extruded cover channels 33, 34, air bag channels 31, 32, and fastener channels 35, 36 which are circumferentially spaced around and directly formed with the external cylindrical surface 23 of the housing 20 such that the housing 20 has a generally cylindrical shape without sharp walls or corners.

It will be understood that a person skilled in the art may make modifications to the preferred embodiment shown herein within the scope and intent of the claims. For example, although the retainer bars 52 are shown as preferably shown as being rods sewn into the air bag 40, it will be appreciated that the retainer bars 52 could be any thickened portion on the air bag 40 or could be plastic retainer bars 52 sewn directly onto the air bag material such that the air bag material does not need to be looped around the retainer bars 52 for easier axial insertion.

Figure 3:
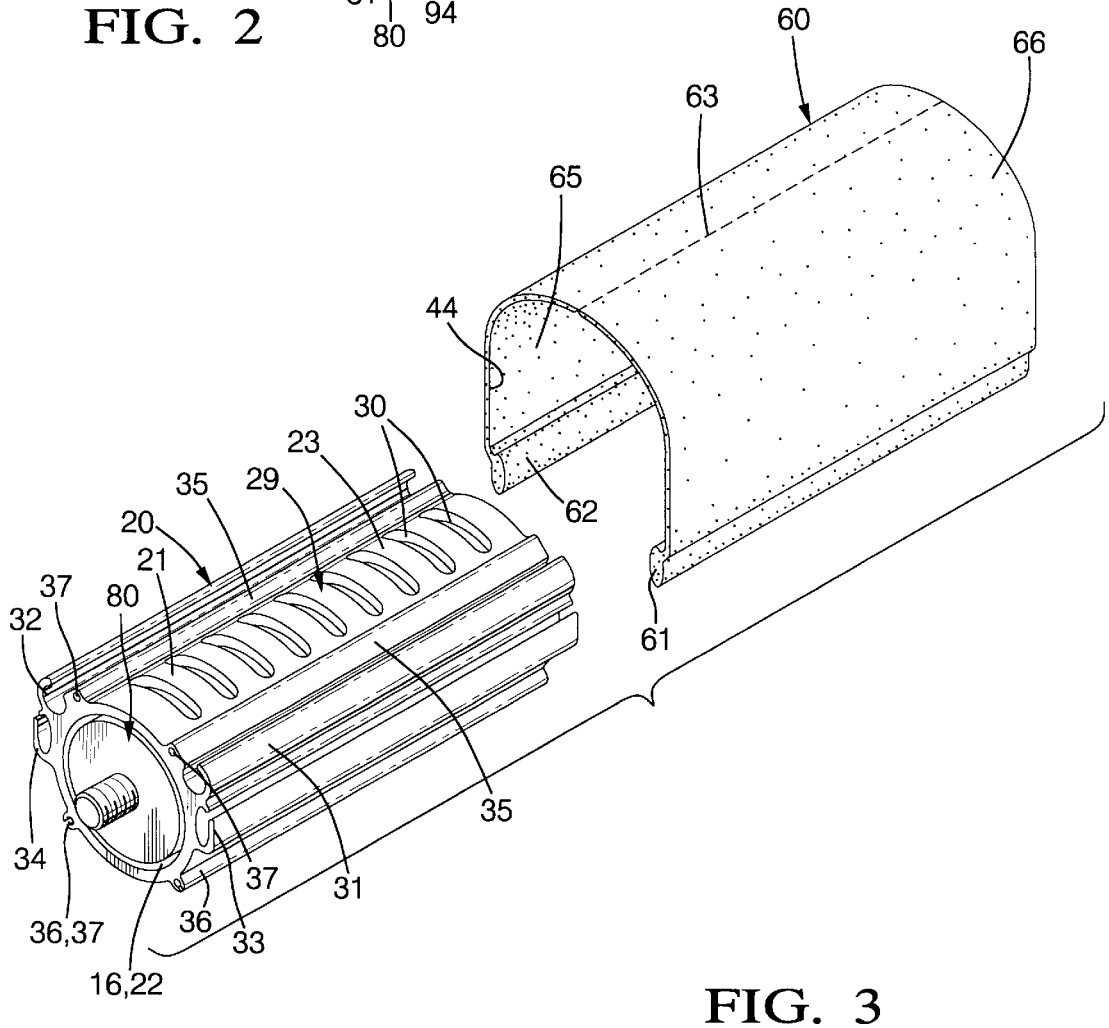
FIG. 3 is an exploded perspective view of the housing and the cover of FIG. 1.
Figure 4:
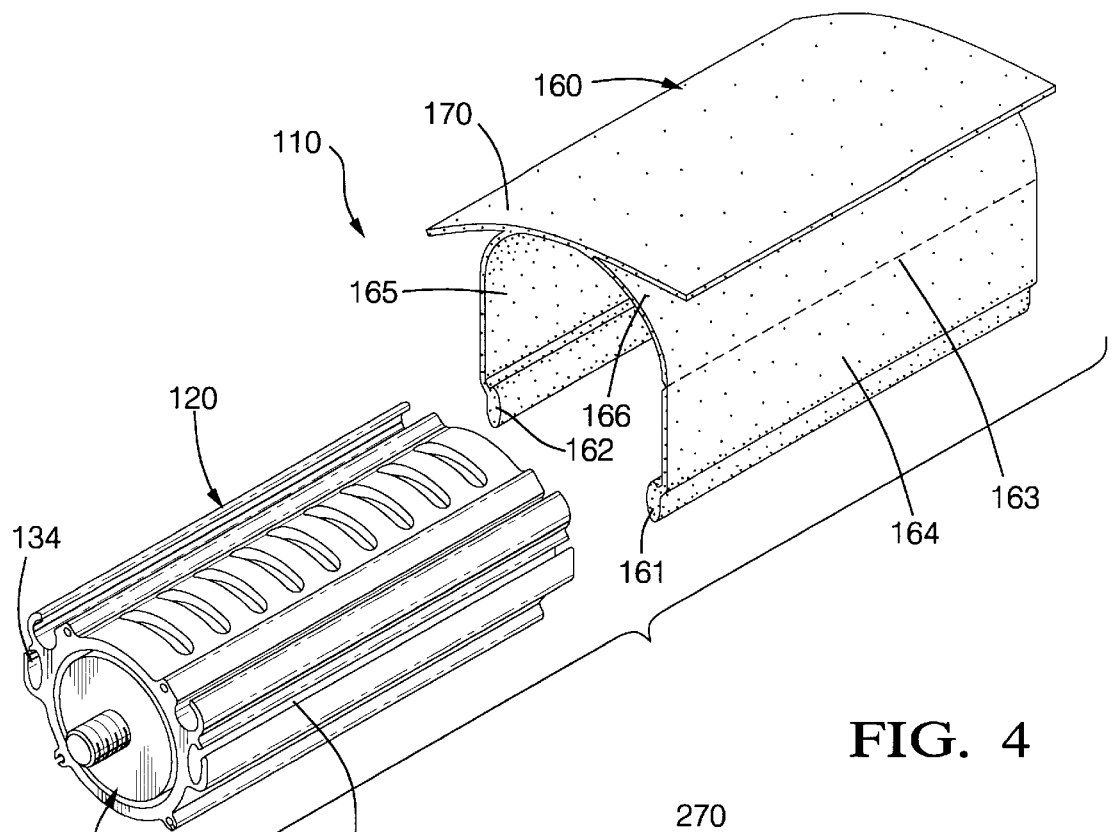
FIG. 4 is a view similar to FIG. 3, but showing an alternate embodiment of the module having an alternate cover.

As another example, FIG. 4 shows an alternate air bag module 110 having a housing 120, air bag (not shown), inflator 180 and end plates (not shown) which are similar to the embodiment shown in FIGS. 1–3 and denoted by similar numerals. The module 110 differs from that shown in FIGS. 1–3 by having an alternate cover 160. The cover 160 is preferably integrally formed of a plastic material by injection molding. The cover 160 has a generally U-shaped cross-section and includes first and second axially extending side walls 164, 165 and a curved upper wall 166 extending between the side walls 164, 165. The cover 160 further includes a show panel 170 which is integrally molded with the cover 160 and joined to the upper wall 166. The show panel 170 can be shaped and colored to match the contour surrounding an opening in the vehicle through which the air bag deploys. The cover 160 includes a weakened tear seam 163 extending axially along the length of one of the side walls, such as 164, which breaks open when pressure is exerted thereon by the deploying air bag. Advantageously, the tear seam 163 located on the side wall 164 does not show on the show panel 170 and cannot be seen when the air bag module 110 is mounted in the vehicle. The cover 160 also includes axially extending, downwardly projecting opposing enlarged portions 161, 162 thereon for attachment to the cover channels 133, 134. The air bag (not shown) is mounted in a similar manner to that shown in FIGS. 1–3.

Figure 5:
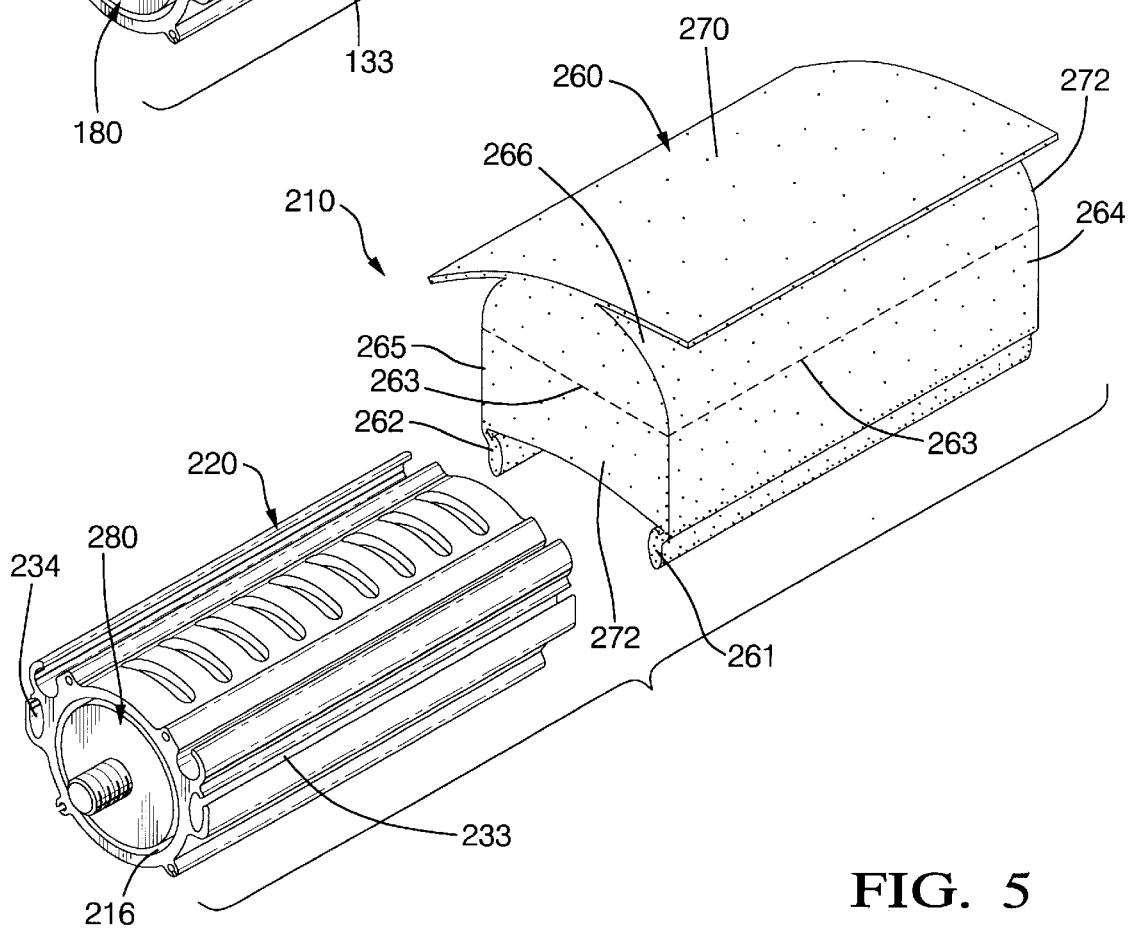
FIG. 5 is a view similar to FIG. 3, but showing another alternate embodiment of the module having another alternate cover.

FIG. 5 shows another alternate air bag module 210 having a housing 220, air bag (not shown), inflator 280 and end plates (not shown) which are similar to the embodiment shown in FIGS. 1–3. The module 210 differs from that shown in FIG. 4 by having an alternate cover 260. The cover 260 is preferably integrally formed of a plastic material by injection molding. The cover 260 has a generally U-shaped cross-section and includes first and second axially extending side walls 264, 265 and a curved upper wall 266 extending between the side walls 264, 265. The cover 260 further includes a show panel 270 which is integrally molded with the cover 260 and joined to the upper wall 266. The show panel 270 can be shaped and colored to match the contour surrounding an opening in the vehicle through which the air bag deploys. The cover 260 further includes first and second opposing end walls 272 which are preferably integrally molded with the cover 260. The cover 260 includes a weakened tear seam 263 extending axially along the length of one of the side walls, such as 264, and both of the end walls 272 to break open when pressure is exerted thereon by the deploying air bag. Accordingly, the cover 260 hinges open along the side wall 265. Advantageously, the tear seam 263 located on the side wall 264 and end walls 272 does not show on the show panel 270 and cannot be seen when the air bag module 210 is mounted in the vehicle. The cover 260 also includes axially extending, downwardly projecting opposing enlarged portions 261, 262 thereon for attachment to the cover channels 233, 234. The air bag is mounted in a similar manner to that shown in FIGS. 1–3. Advantageously, the end walls 272 on the cover 260 enable the use of shorter end plates which only need to cover the open ends 216 of the housing 220.

Figure 6:
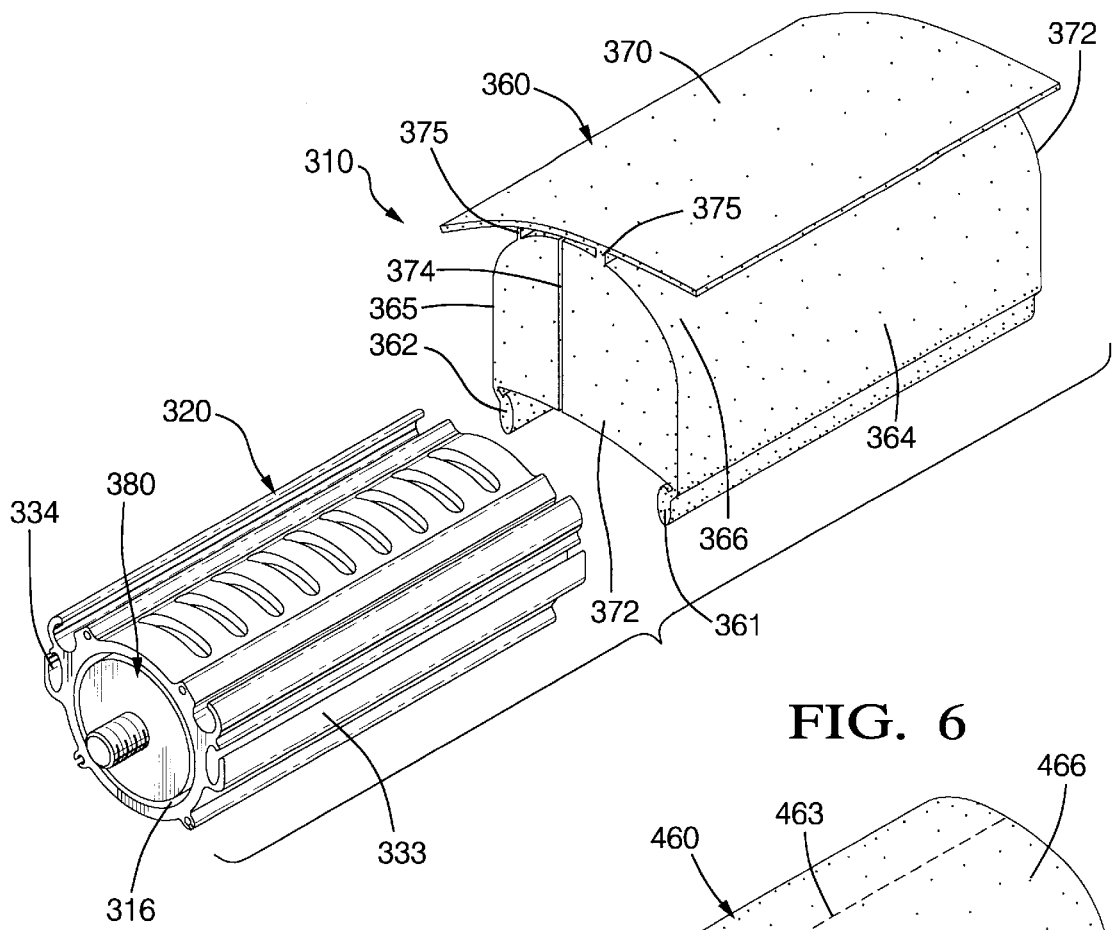
FIG. 6 is a view similar to FIG. 3, but showing yet another alternate embodiment of the module having yet another alternate cover.

FIG. 6 shows yet another alternate air bag module 310 having a housing 320, air bag (not shown), inflator 380 and end plates (not shown) which are similar to the embodiment shown in FIGS. 1-3. The module 310 differs from that shown in FIG. 4 by having an alternate cover 360. The cover 360 is preferably integrally formed of a plastic material by injection molding. The cover 360 has a generally U-shaped cross-section and includes first and second axially extending side walls 364, 365 and a curved upper wall 366 extending generally between the side walls 364, 365. The cover 360 further includes first and second opposing end walls 372 which are preferably integrally molded with the cover 360. The cover 360 includes an open seam 374 extending vertically along both of the end walls 372 and axially along the top of the upper wall 366. The cover 360 further includes a show panel 370 which is integrally molded with the cover 360 and joined to the upper wall 366 at a pair of rib portions 375. The show panel 370 can be shaped and colored to match the contour surrounding an opening in the vehicle through which the air bag deploys. The cover 360 includes a weakened tear seam (not shown) extending axially along the length of one of the rib portions 375 such that the other of the rib portions 375 acts as a hinge about which the show panel 370 can pivot open during air bag deployment. The open seam 374 enables the cover 360 to split open upon air bag deployment. Advantageously, the tear seam located on the rib portion 375 does not show from the show panel 370 and cannot be seen when the air bag module 310 is mounted in the vehicle. The cover 360 also includes axially extending, downwardly projecting, opposing enlarged portions 361, 362 thereon for attachment to the cover channels 333, 334. The air bag is mounted in a similar manner to that shown in FIGS. 1–3. Advantageously, the end walls 372 on the cover 360 enable the use of shorter end plates which only need to cover the open ends 316 of the housing 320.

Figure 7:
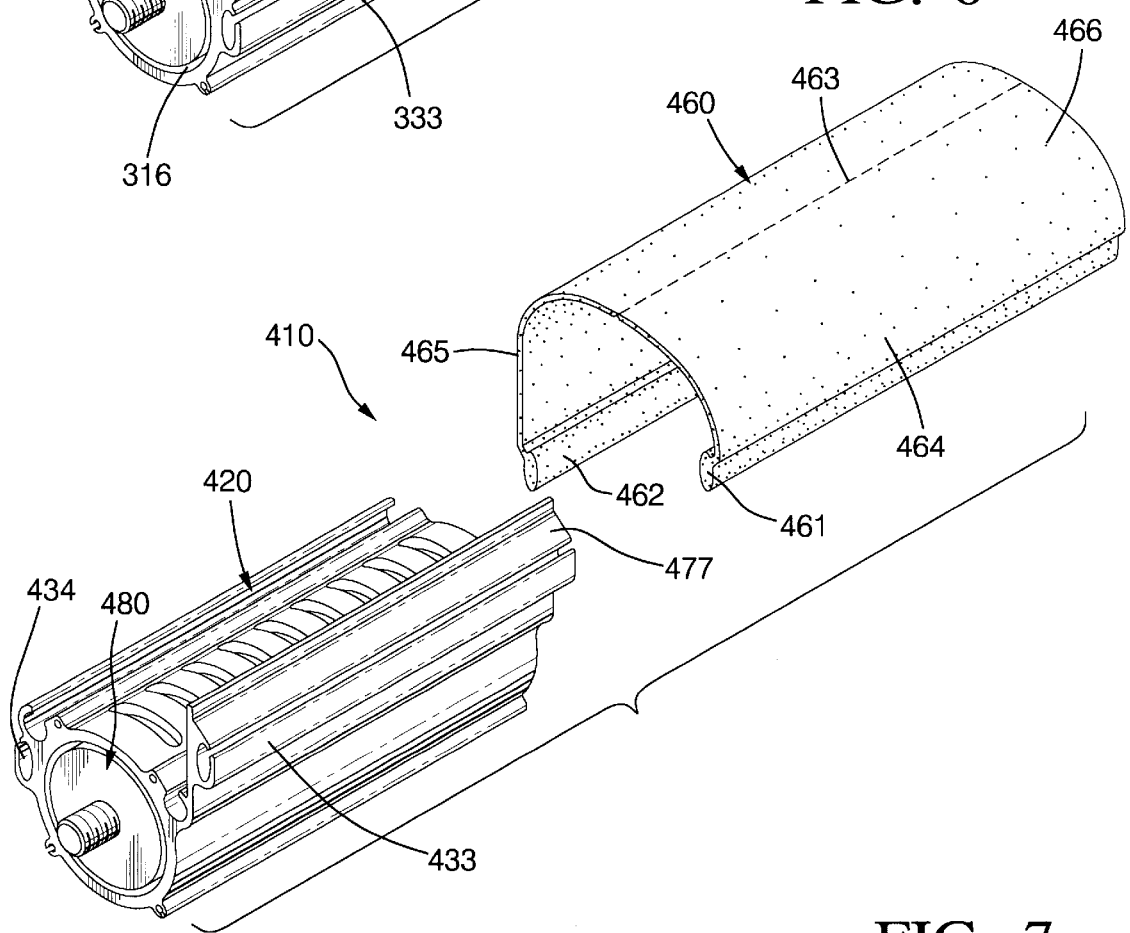
FIG. 7 is a view similar to FIG. 3, but showing an alternate embodiment of the module including an alternate housing having an alternate cover.

FIG. 7 shows yet another alternate air bag module 410 having an air bag (not shown), inflator 480 and end plates (not shown) which are similar to the embodiment shown in FIGS. 1–3. The module 410 differs from that shown in FIGS. 1–3 by having an alternate housing 420 and cover 460. The housing 420 includes a single upwardly projecting wall portion 477 which can provide additional guidance to the air bag during deployment. However, the additional wall portion 477 no longer provides a generally cylindrical housing 420 and is more difficult to extrude since the extrusion will become unbalanced. The cover 460 is preferably integrally formed of a plastic material by injection molding. The cover 460 has a generally U-shaped cross-section and includes first and second axially extending side walls 464, 465 and a curved upper wall 466 extending between the side walls 464, 465. One of the side walls 464 is shorter than in the previous embodiments due to the wall portion 477 on the housing 420. The cover 460 includes a weakened tear seam 463 extending axially along the length of the upper wall 466 which breaks open when pressure is exerted thereon by the deploying air bag. The cover 460 also includes axially extending, downwardly projecting opposing enlarged portions 461, 462 thereon for attachment to the cover channels 433, 434. The air bag (not shown) is mounted in a similar manner to that shown in FIGS. 1–3. It will be appreciated that any of the cover styles 160, 260, or 360 could also be used in conjunction with this housing 420.

Figure 8:
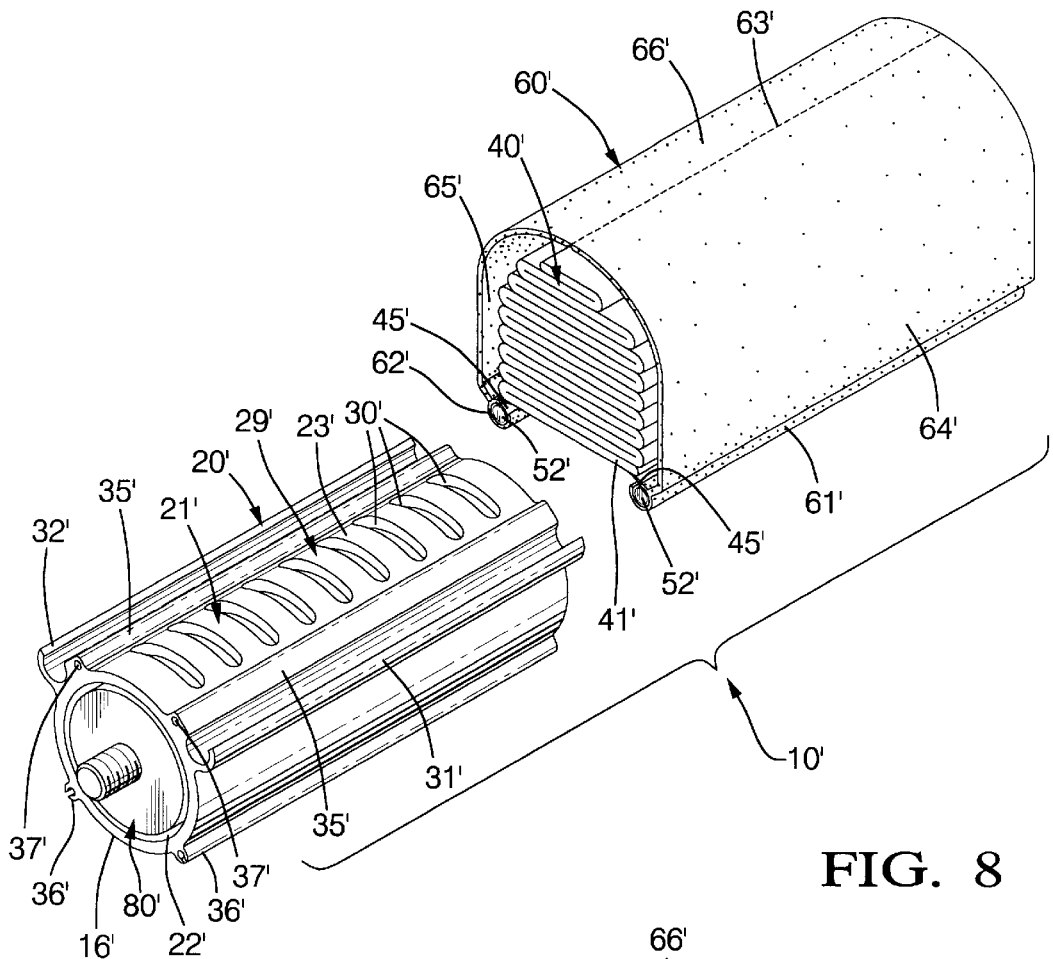
FIG. 8 is a partially exploded perspective view showing still a further alternate embodiment of the module having an alternate cover and air bag attachment.
Figure 9:
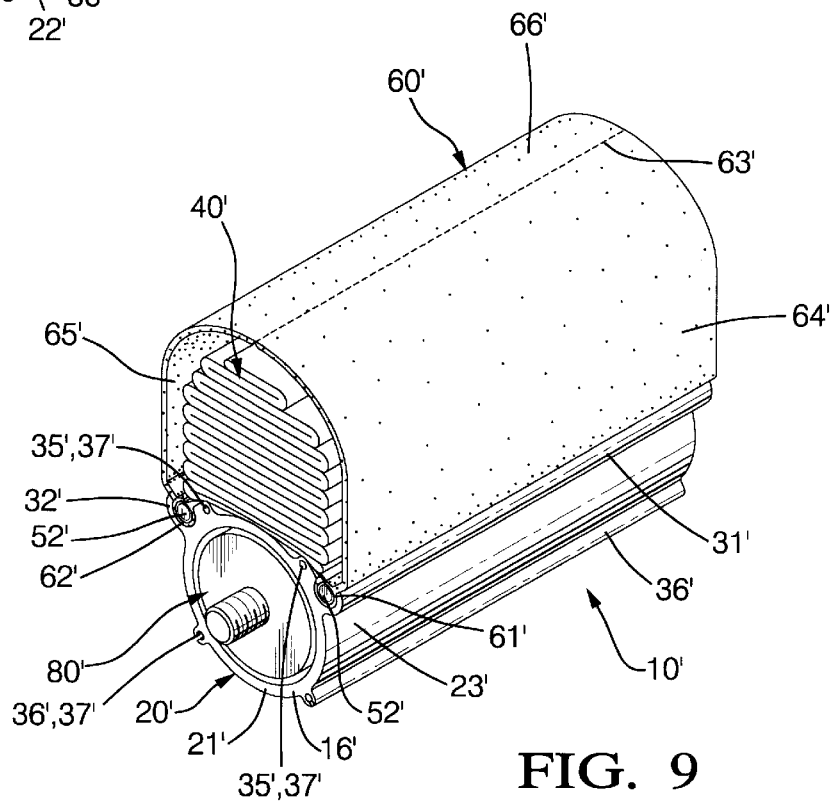
FIG. 9 is an assembled view of the module of FIG. 8.
Figure 10:
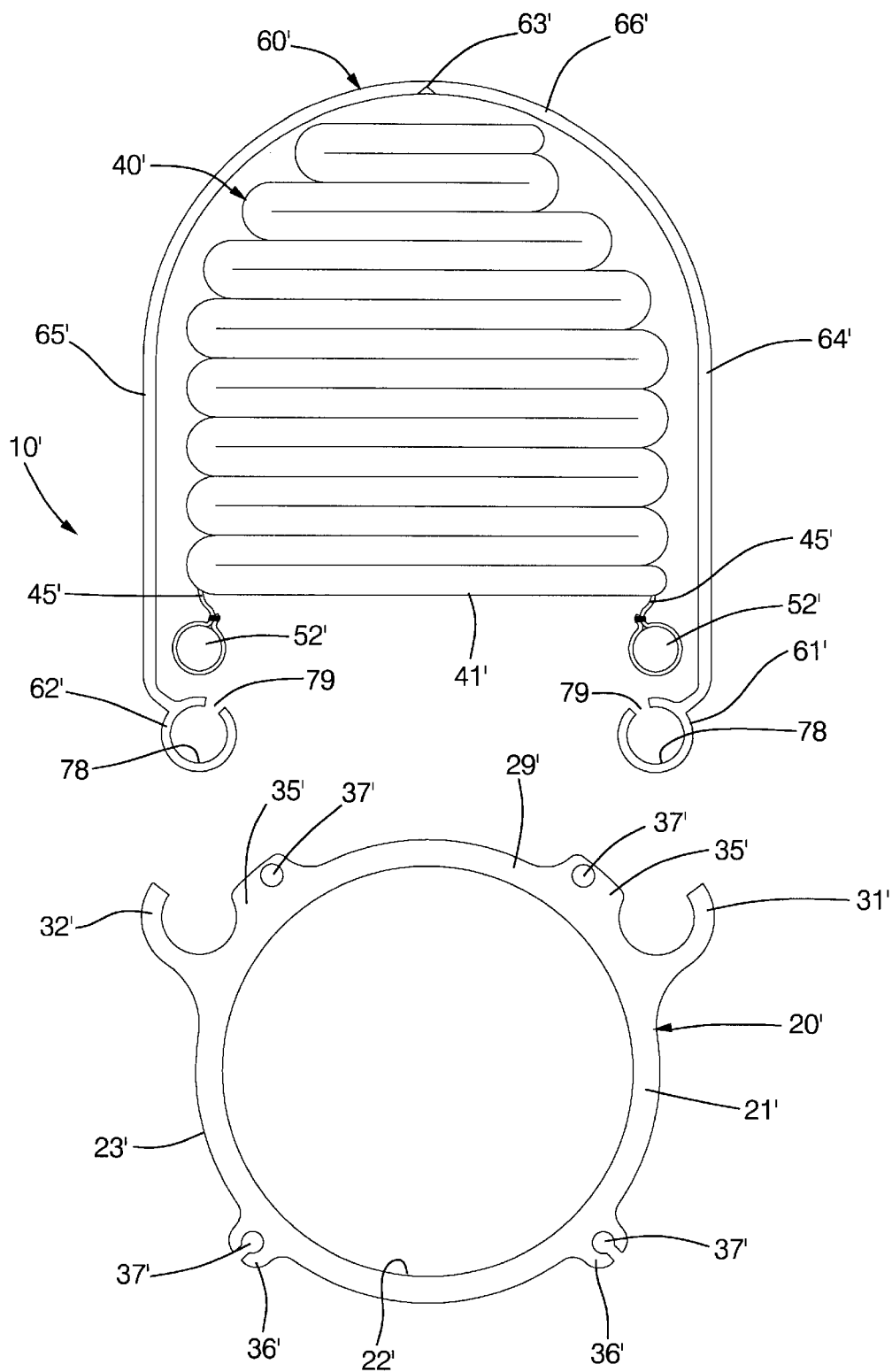
FIG. 10 is an exploded end view of the module of FIG. 9.

FIGS. 8, 9 and 10 show yet a further alternate embodiment of the invention having a simplified cover and air bag attachment. Components similar to those in FIGS. 1–3 are designated by similar numerals with a prime added. As best shown in FIG. 8, an air bag module 10' generally includes the component parts of an extruded housing 20', an inflator 80' mounted in the housing 20', an air bag 40' and cover 60' secured to the housing 20' and a pair of opposing end plates (not shown) attached to the housing 20'.

The housing 20' is an open-ended, axially elongated, single continuous extrusion which has a cylindrical wall 21' including an internal cylindrical surface 22' and an external cylindrical surface 23'. The extruded housing 20' also includes an integrally formed, axially extending diffuser portion 29' which is integrally formed as part of the cylindrical wall 21'. It will be appreciated that any number and arrangement of diffuser openings 30' may be provided in the cylindrical wall 21' by a secondary operation to provide the diffuser portion 29'. Preferably, the diffuser portion 29' permits the discharge of inflator gas more evenly into the air bag 40' upon inflation.

The housing 20' preferably includes first and second axially extending air bag and cover channels 31', 32' which preferably extend along the entire axial length of the housing 20'. Advantageously, only a single pair of channels 31', 32' are needed to mount both the cover 60' and the air bag 40' to the housing 20'. The channels 31', 32' are preferably extruded directly onto the external cylindrical surface 23' of the housing 20'. The channels 31', 32' are each preferably spaced circumferentially apart on opposing sides of the diffuser portion 29'. Advantageously, the single pair of air bag and cover channels 31', 32' disposed on the external cylindrical surface 23' maintain the generally cylindrical shape of the housing 20' such that the housing 20' is compact for packaging and is free of sharp angles and walls. The air bag and cover channels 31', 32' are sized and shaped for receiving both the respective air bag retainer bars 52' of the air bag 40' and the enlarged portions 61', 62' of the cover 60' therein without the use of fasteners, as described further hereinafter.

The housing 20' also preferably includes a plurality of axially extending, integrally formed pairs of upper and lower fastener channels 35', 36' extending the entire axial length of the extruded housing 20'. The fastener channels 35', 36' are preferably extruded directly onto the external cylindrical surface 23' of the cylindrical wall 21' and are circumferentially spaced in relation to the diffuser portion 29' and the air bag and cover channels 31', 32'. Preferably, the upper pair of fastener channels 35' are each positioned circumferentially between the diffuser portion 29' and the respective channels 31', 32'. Preferably, the lower pair of fastener channels 36' are each positioned circumferentially between the channels 31', 32' on opposing lower sides of the external cylindrical surface 23' of the housing 20'. Advantageously, the fastener channels 35', 36' disposed on the external cylindrical surface 23' maintain the generally cylindrical shape of the housing 20' such that the housing 20' is compact for packaging. The fastener channels 35', 36' include channel apertures 37' for receiving end plate fasteners (not shown) for attaching the end plates (not shown) to the housing 20' to close the open ends 16' of the housing 20'.

Referring to FIGS. 8–10, the air bag 40' is made of a conventional fabric material and is normally stored in a folded condition within the cover 60'. The air bag 40' includes a mouth portion 41' forming an air bag opening for receiving inflator gas therethrough. The mouth portion 41' includes axially extending, opposing side edges 45'.

The module 10' also includes a pair of axially elongated retainer bars 52' each preferably being a one-piece continuous extrusion formed of a rigid material. The side edges 45' of the air bag 40' are preferably wrapped around the retainer bars 52' and connected onto themselves, such as by sewing, to connect the retainer bars 52' to the air bag 40'. The retainer bars 52' are sized and shaped for being closely received within the enlarged portions 61', 62' of the cover 60', as described below.

The module 10' includes the cover 60' which is preferably integrally formed of a plastic material by injection molding. The cover 60' has a generally U-shaped cross section and includes first and second axially extending side walls 64', 65' and a curved upper wall 66' extending between the side walls 64', 65'. The cover 60' includes a weakened tear seam 63' on the upper wall 66' and extending axially along its length which breaks open when pressure is exerted thereon by a deploying air bag 40'.

The cover 60' includes axially extending, downwardly projecting opposing enlarged portions 61', 62' thereon. The enlarged portions 61', 62' of the cover 60' are each preferably hollow to form axially extending grooves 78 therein which are sized and shaped for receiving the air bag retainer bars 52' and associated portion of the air bag 40' therein by axial insertion. The enlarged portions 61', 62' also preferably each include a slitted opening 79 extending axially along the length, as best shown in FIG. 10, such that the air bag 40' can extend therethrough upon assembly of the retainer bars 52' into the enlarged portions 61', 62'. The enlarged portions 61', 62' are also preferably sized and shaped for being closely received within the channels 31', 32' formed on the extruded housing 20'. The enlarged portions 61', 62' preferably are shown as generally circular for matching the generally circular shape of the air bag retainer bars 52' and channels 31', 32'. However, it will be appreciated that any mating geometrical shapes of the enlarged portions 61', 62', the air bag retainer bars 52' and the air bag and cover channels 31', 32' of the housing 20' may be possible, such as rectangular, oval or others. It will be appreciated that in this particular embodiment, the cover 60' is preferably not a show cover 60' and a separate show cover (not shown) may be provided in the instrument panel or other part of the vehicle under which the air bag module 10' is stored. However, it will be appreciated that any of the covers 60, 160, 260, or 360 shown in the prior embodiments could be modified to have hollow enlarged portions 61', 62' including grooves 78 for receiving the air bag retainers 52' therein.

The air bag module 10' is generally assembled as follows. After the retainer bars 52' are attached to the air bag 40', the retainer bars 52' are each coaxially aligned with the grooves 78 on the enlarged portions 61', 62' of the cover 60' and axially slid therein for attachment to the cover 60'. Next, the cover 60', air bag 40' and air bag retainer bars 52' are simultaneously attached to the housing 20' by axially sliding the enlarged portions 61', 62' of the cover 60', with the air bag retainer bars 52' therein, into the respective air bag and cover channels 31', 32' on the housing 20'. Also the inflator 80' is axially inserted into the inside of the cylindrical wall 21' of the housing 20' through one of the open ends 16'. It will be appreciated that the cover 60' maintains the air bag 40' in the folded condition.

The end plates (not shown) are attached to the opposing open ends 16' of the housing 20' to axially trap the inflator 80', the enlarged portions 61', 62' of the cover 60,' and the retainer bars 52' within the housing 20' to secure the cover 60', air bag 40' and inflator 80' within the housing 20'.

Advantageously, the housing 20' only includes a single pair of channels 31', 32' which mount both the cover 60' and the air bag 40' to the housing. Thus, the cylindrical housing 20' is made even lighter and more compact than in the previous embodiments. It will further be appreciated that for the embodiment shown in FIGS. 8–10, the housing 20' need not be limited to extrusions, but could also be made in other manners, such as forming or molding.

While the present invention has been described as carried out in a specific embodiment thereof, it is not intended to be limited thereby but is intended to cover the invention broadly within the scope and spirit of the claims.

What is claimed is:

1. An air bag module for use in a vehicle, the module comprising:

an axially elongated inflator for generating inflator gas;

an air bag for inflation upon the discharge of the inflator gas from the inflator, the air bag including axially elongated retainer bars;

an axially elongated, open-ended, generally cylindrical extruded housing having a circular-shaped cross-section defined by a single cylindrical wall having an internal wall surface and an external wall surface, the inflator being disposed within the internal wall surface and the cylindrical wall including at least one diffuser opening therethrough for diffusing gas into the air bag;

first and second integrally extruded air bag channels directly disposed on the external wall surface on opposing sides of said diffuser opening, the integrally extruded air bag channels for axially receiving the retainer bars of the air bag therein for attachment of the air bag to the housing whereby the cylindrical wall and the air bag channels form a generally cylindrical-shaped housing; and a cover having side walls including axially extending enlarged portions, and the housing including axially extending cover channels shaped for closely receiving the enlarged portions of the cover therein, and wherein the cover channels are disposed on the external wall surface such that the cylindrical wall, the cover channels, and the air bag channels form a generally cylindrical-shaped housing, and wherein the side walls of the cover serve as a deployment chute for the air bag;

the cover including an integrally formed upper show panel extending generally perpendicular to the side walls; and the cover including a weakened tear seam disposed on one of the side walls and beneath the upper show panel and wherein the tear seam is invisible from the upper show panel.

2. An air bag module for use in a vehicle, the module comprising:

an axially elongated inflator for generating inflator gas;

an air bag for inflation upon the discharge of the inflator gas from the inflator, the air bag including axially elongated retainer bars;

an axially elongated, open-ended, generally cylindrical extruded housing having a circular-shaped cross-section defined by a single cylindrical wall having an internal wall surface and an external wall surface, the inflator being disposed within the internal wall surface and the cylindrical wall including at least one diffuser opening therethrough for diffusing gas into the air bag; and first and second integrally extruded air bag channels directly disposed on the external wall surface on opposing sides of said diffuser opening, the integrally extruded air bag channels for axially receiving the retainer bars of the air bag therein for attachment of the air bag to the housing whereby the cylindrical wall and the air bag channels form a generally cylindrical-shaped housing;

a cover having side walls including axially extending enlarged portions and the housing including axially extending cover channels shaped for closely receiving the enlarged portions of the cover therein, and wherein the cover channels are disposed on the external wall surface such that the cylindrical wall, the cover channels, and the air bag channels form a generally cylindrical-shaped housing, and wherein the side walls of the cover serve as a deployment chute for the air bag;

the cover including an integrally formed upper show panel extending generally perpendicular to the side walls; and the cover including integrally formed end walls extending between and closing the side walls.

3. The air bag module of claim 2 wherein the cover includes a weakened tear seam extending around both of the end walls and one of the side walls and wherein the tear seam is invisible from the top of the upper show panel.

4. An air bag module for use in a vehicle, the module comprising:

an axially elongated inflator for generating inflator gas;

an air bag for inflation upon the discharge of the inflator gas from the inflator, the air bag including axially elongated retainer bars;

an axially elongated, open-ended, generally cylindrical extruded housing having a circular-shaped cross-section defined by a single cylindrical wall having an internal wall surface and an external wall surface, the inflator being disposed within the internal wall surface and the cylindrical wall including at least one diffuser opening therethrough for diffusing gas into the air bag;

first and second integrally extruded air bag channels directly disposed on the external wall surface on opposing sides of said diffuser opening, the integrally extruded air bag channels for axially receiving the retainer bars of the air bag therein for attachment of the air bag to the housing whereby the cylindrical wall and the air bag channels form a generally cylindrical-shaped housing; and a cover having side walls including axially extending enlarged portions and the housing including axially extending cover channels shaped for closely receiving the enlarged portions of the cover therein, and wherein the cover channels are disposed on the external wall surface such that the cylindrical wall, the cover channels, and the air bag channels form a generally cylindrical-shaped housing;

the cover including a curved upper wall extending between the side walls and wherein the cover includes an upper show panel extending generally perpendicular to the side walls and connected to the upper wall.

5. The air bag module of claim 4 wherein the cover includes axially extending, first and second rib portions connecting the upper show panel to the upper wall and wherein one of the rib portions includes a tear seam which breaks open upon air bag deployment whereby the upper show panel hinges open about the other of the rib portions.

6. An air bag module for use in a vehicle, the module comprising:

an axially elongated inflator for generating inflator gas;

an air bag for inflation upon the discharge of the inflator gas from the inflator, the air bag including axially extending retainer bars;

an axially elongated housing;

exactly two axially elongated, integrally formed channels directly disposed on the housing; and a cover having axially extending enlarged portions thereon, the enlarged portions being hollow and sized and shaped for receiving the air bag retainer bars therein, one of the enlarged portions and one of the retainer bars being captured within one of the channels and the other of the enlarged portions and the other of the retainer bars being captured in the other of the channels whereby exactly two channels on the housing mount both the air bag and the cover to the housing; the enlarged portions further including a slitted opening through which the air bag extends upon attachment of the retainer bars to the enlarged portions of the cover, and the cover being generally U-shaped and including first and second axially extending side walls on which the enlarged portions are respectively disposed, the cover including an integrally formed upper show panel extending generally perpendicular to the side walls; and the cover including a weakened tear seam disposed on one of the side walls and beneath the upper show panel and wherein the tear seam is invisible from the upper show panel.

7. An air bag module for use in a vehicle, the module comprising:

an axially elongated inflator for generating inflator gas;

an air bag for inflation upon the discharge of the inflator gas from the inflator, the air bag including axially extending retainer bars;

an axially elongated housing;

exactly two axially elongated, integrally formed channels directly disposed on the housing; and a cover having axially extending enlarged portions thereon, the enlarged portions being hollow and sized and shaped for receiving the air bag retainer bars therein, one of the enlarged portions and one of the retainer bars being captured within one of the channels and the other of the enlarged portions and the other of the retainer bars being captured in the other of the channels whereby exactly two channels on the housing mount both the air bag and the cover to the housing; the enlarged portions further including a slitted opening through which the air bag extends upon attachment of the retainer bars to the enlarged portions of the cover, and the cover being generally U-shaped and including first and second axially extending side walls on which the enlarged portions are respectively disposed;

the cover including integrally formed end walls extending between and closing the side walls.

8. The air bag module of claim 7 wherein the cover includes a weakened tear seam extending around both of the end walls and one of the side walls.

9. An air bag module for use in a vehicle, the module comprising:

an axially elongated inflator for generating inflator gas;

an air bag for inflation upon the discharge of the inflator gas from the inflator, the air bag including axially extending retainer bars;

an axially elongated housing;

exactly two axially elongated, integrally formed channels directly disposed on the housing; and a cover having axially extending enlarged portions thereon, the enlarged portions being hollow and sized and shaped for receiving the air bag retainer bars therein, one of the enlarged portions and one of the retainer bars being captured within one of the channels and the other of the enlarged portions and the other of the retainer bars being captured in the other of the channels whereby exactly two channels on the housing mount both the air bag and the cover to the housing, and the cover including first and second axially extending side walls on which the enlarged portions are respectively disposed;

the cover including a curved upper wall extending between the side walls and the cover including an upper show panel extending generally perpendicular to the side walls and connected to the upper wall.

10. The air bag module of claim 9 wherein the cover includes axially extending, first and second rib portions connecting the upper show panel to the upper wall and wherein one of the rib portions includes a tear seam which breaks open upon air bag deployment whereby the upper show panel hinges open about the other of the rib portions.

11. An air bag module for use in a vehicle, the module comprising:

an axially elongated inflator for generating inflator gas;

an air bag for inflation upon the discharge of the inflator gas from the inflator, the air bag including axially elongated retainer bars;

an axially elongated, open-ended, generally cylindrical extruded housing, the inflator being disposed within the housing;

first and second integrally extruded air bag channels disposed on the housing, the integrally extruded air bag channels for axially receiving the retainer bars of the air bag therein for attachment of the air bag to the housing; and a cover having side walls including axially extending enlarged portions, and the housing including axially extending cover channels shaped for closely receiving the enlarged portions of the cover therein;

the cover including an integrally formed upper show panel extending generally perpendicular to the side walls; and the cover including a weakened tear seam disposed on one of the side walls and beneath the upper show panel and wherein the tear seam is invisible from the upper show panel.

12. An air bag module for use in a vehicle, the module comprising:

an axially elongated inflator for generating inflator gas;

an air bag for inflation upon the discharge of the inflator gas from the inflator, the air bag including axially elongated retainer bars;

an axially elongated, open-ended, generally cylindrical extruded housing, the inflator being disposed within the housing; and integrally extruded air bag channels disposed on the housing, the integrally extruded air bag channels for axially receiving the retainer bars of the air bag therein for attachment of the air bag to the housing;

a cover having side walls including axially extending enlarged portions and the housing including axially extending cover channels shaped for closely receiving the enlarged portions of the cover therein;

the cover including an integrally formed upper show panel extending generally perpendicular to the side walls; and the cover including integrally formed end walls extending between and closing the side walls.

13. The air bag module of claim 12 wherein the cover includes a weakened tear seam extending around both of the end walls and one of the side walls and wherein the tear seam is invisible from the top of the upper show panel.

14. An air bag module for use in a vehicle, the module comprising:

an axially elongated inflator for generating inflator gas;

an air bag for inflation upon the discharge of the inflator gas from the inflator, the air bag including axially elongated retainer bars;

an axially elongated, open-ended, generally cylindrical extruded housing, the inflator being disposed within the housing;

integrally extruded air bag channels disposed on the housing, the integrally extruded air bag channels for axially receiving the retainer bars of the air bag therein for attachment of the air bag to the housing;

a cover having side walls including axially extending enlarged portions and the housing including axially extending cover channels shaped for closely receiving the enlarged portions of the cover therein; and the cover including a curved upper wall extending between the side walls and wherein the cover includes an upper show panel extending generally perpendicular to the side walls and connected to the upper wall.

15. The air bag module of claim 14 wherein the cover includes axially extending, first and second rib portions connecting the upper show panel to the upper wall and wherein one of the rib portions includes a tear seam which breaks open upon air bag deployment whereby the upper show panel hinges open about the other of the rib portions.

16. An air bag module for use in a vehicle, the module comprising:

an axially elongated inflator for generating inflator gas;

an air bag for inflation upon the discharge of the inflator gas from the inflator, the air bag including axially extending retainer bars;

an axially elongated housing;

two axially elongated, integrally formed channels directly disposed on the housing; and a cover having axially extending enlarged portions thereon, the enlarged portions being hollow and sized and shaped for receiving the air bag retainer bars therein, one of the enlarged portions and one of the retainer bars being captured within one of the channels and the other of the enlarged portions and the other of the retainer bars being captured in the other of the channels whereby the two channels on the housing mount both the air bag and the cover to the housing; the enlarged portions further including a slitted opening through which the air bag extends upon attachment of the retainer bars to the enlarged portions of the cover; and the cover being generally U-shaped and including first and second axially extending side walls on which the enlarged portions are respectively disposed, the cover including an integrally formed upper show panel extending generally perpendicular to the side walls, the cover including a weakened tear seam disposed on one of the side walls and beneath the upper show panel and wherein the tear seam is invisible from the upper show panel.

\* \* \* \* \*